March 12, 1929. G. R. HOWELL 1,704,971
AUTOMOBILE HEATING SYSTEM
Filed March 2, 1928
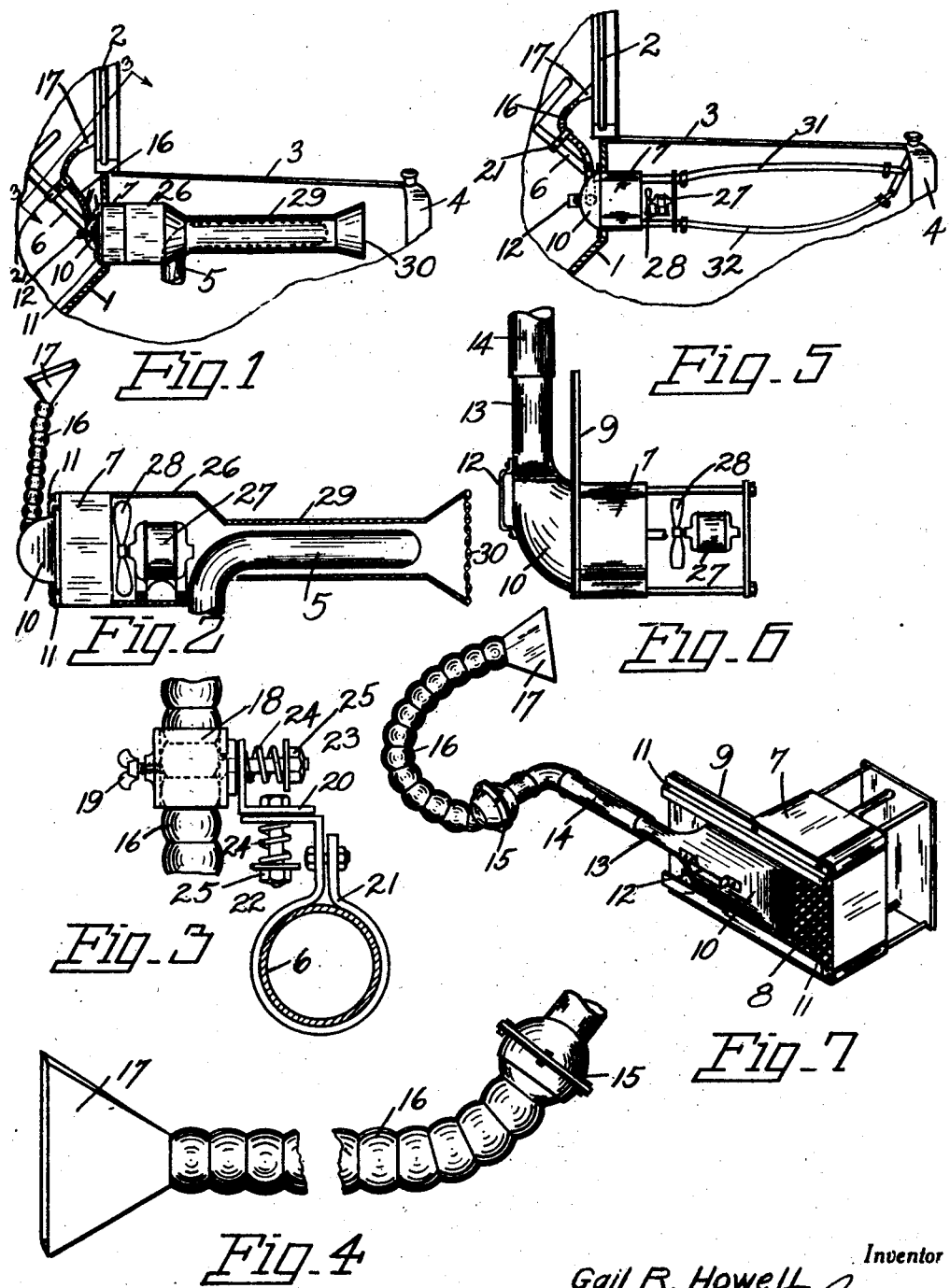
Inventor
Gail R. Howell
By Herbert E. Smith
Attorney Patented Mar. 12, 1929.

1,704,971

UNITED STATES PATENT OFFICE.

GAIL R. HOWELL, OF SPOKANE, WASHINGTON.

AUTOMOBILE HEATING SYSTEM.

Application filed March 2, 1928. Serial No. 258,614.

My present invention relates to improvements in automobile heating systems of the type utilized as an auxiliary device for heating the interior of automobiles. The primary object of the invention is the provision of an inexpensive appliance that may be adapted for use with automobiles of various makes to provide an efficient and economical heater for the interior of the car. Means are provided whereby the air may be heated from the exhaust manifold, or the air may be heated by passing over hot water pipes from the cooling system of the automobile, but in either case the warmed or heated air is forced into the interior of the automobile and distributed as desired. Means are provided whereby the warm air may be distributed to the interior of the car, or to the wind-shield for the purpose of clearing the glass plate of the shield, or the air may be directed for both of these uses.

The invention consists in certain novel combinations and arrangements of parts as will hereinafter be more fully set forth and claimed.

In the accompanying drawings I have illustrated two examples of the physical embodiment of my invention, one using the exhaust manifold and the other using heat from the water cooling system of the motor, wherein the parts are combined and arranged according to the best modes I have so far devised for the practical application of the principles of my invention.

Figure 1 is a view showing a portion of an automobile equipped with the heating appliance of my invention. Figure 2 is a similar view with parts in section. Figure 3 is an enlarged detailed view showing the means for clamping the flexible hot air tube to the steering post of the automobile. Figure 4 is a detailed broken view of the hot air tube showing a universal joint therein. Figure 5 is a view showing the heating appliance connected with the water radiator of the automobile. Figure 6 is a detail view on an enlarged scale of parts in Figure 5. Figure 7 is a perspective view showing particularly the heat distributing slide and the flexible hot air tube.

In order that the general arrangement and relation of parts may readily be understood I have shown so much of an automobile as is necessary, including the foot board 1, the wind-shield 2 and the hood 3. In some instances the radiator 4 is utilized, while in other cases the exhaust manifold 5 is employed for providing the heat to the air, and the steering post 6 is also utilized in the installation of my heating appliance.

In carrying out my invention I employ a hot air housing 7 which is preferably of rectangular shape and is fixed in an opening in the dash board 1 and this housing is provided with a reticulated front 8 which may be a radiator of the honeycomb type adapted to receive water from the water cooling system of the motor.

The housing 7 has a side extension 9 to form a closed front, and the front part of the housing supports a slide cover 10 which is of concavo-convex formation to provide a hot air chamber in front of the reticulated front 8 of the housing. This slide cover may be moved longitudinally within the guides 11 secured at the upper and lower parts of the front of the housing and the cover has a handle 12 with which it may be moved to adjusted position. In Figure 7 the cover 10 is in position whereby the interior of the automobile may be heated and also whereby warm air currents may be directed over the wind-shield to melt ice and snow thereon.

The slide cover 10 is fashioned with an air tube 13 to which a pipe 14 is attached, and this pipe 14 is provided with a universal joint as 15. The flexible air tube 16 is connected to the universal joint and this flexible tube is fastened at its end with a nozzle 17. It will be apparent that the nozzle end of the flexible tube may be passed over an extensive area of the wind-shield on its inner side for the purpose of warming the glass and thereby melting any ice or snow on the exterior face of the wind-shield.

The flexible warm air tube is preferably supported from the steering post 6, and for this purpose I employ a clamping clip 18 which is clamped by a bolt 19 on the flexible air tube, and by the use of an angle plate 20 and an annular clamp 21, the latter on the steering post, a flexible joint is provided between the flexible air tube and the supporting steering post. This flexible joint is provided with spring bolts 22 and 23 for the clamp members and angle plate, and bolt springs 24 and nuts 25 are used for retaining flexible joint in adjusted position. Thus it will be apparent that the flexible air tube 16 by use of the universal joint 15 and the flexible joint between the air tube and the steering post, may be moved through a considerable area for the purpose of warming the wind-shield for the purpose described.

In front of the housing 7 and located beneath the hood 3 of the automobile, a motor casing 26 is arranged to form an extension of the housing. This casing encloses an electric motor 27 and its fan 28, and these members are designed to force air through the reticulated front 8 of the housing 7 and either into the interior of the car, into the flexible air pipe, or into both the car and the air pipe. In Figure 2 it will be seen that the air is drawn through an air heating pipe or stove 29 that encloses the exhaust manifold 5, and this stove has a screened or reticulated closure 30 through which air is drawn. It will be apparent that the fan when in operation will draw air currents through the stove 29 and these air currents are heated by contact with the exhaust manifold 5, for which they are passed through the housing 7 as before described.

In Figure 5 the appliance is shown as receiving hot water from the radiator 4 through the inlet pipe 31 to the housing 7, and a return pipe 32 between the housing and the radiator provides for a circulation of hot water from the motor cooling system. The hot water passing through the housing 7 and its reticulated front 8 provides the heating medium for the passing air currents as they are forced through the housing 7.

Having thus fully described my invention what I claim as new and desire to secure by Letters Patent is:—

1. A heating appliance for automobiles comprising a housing having a reticulated front and means for forcing hot air currents through said front, a slide cover for controlling the area of the reticulated front, and an air tube connected to said slide cover.

2. In a heating appliance for an automobile, the combination with a housing having a reticulated front, and means for forcing hot air currents therethrough, of an extension on the front and guides thereon, a slidable cover movable in said guides to control the area of the reticulated front, a flexible air tube connected to said cover, and an air nozzle on said tube, whereby the interior of an automobile may be heated or hot air currents may be distributed from the nozzle.

3. The combination with a stove member adapted to enclose an exhaust manifold, of a motor casing connected therewith, and a fan in said casing, a housing connected with the casing having an open front, a slide cover for controlling the area of the open front, and a flexible air distributing tube connected to said slide cover for the purpose described.

In testimony whereof I affix my signature.

GAIL R. HOWELL.